United States Patent [19]

Harris

[11] Patent Number: 4,925,288

[45] Date of Patent: May 15, 1990

[54] ADJUSTABLE MIRROR MOUNT

[75] Inventor: John R. Harris, San Carlos, Calif.

[73] Assignee: Coherent, Inc., Palo Alto, Calif.

[21] Appl. No.: 356,012

[22] Filed: May 23, 1989

[51] Int. Cl.⁵ .............................................. G02B 5/08
[52] U.S. Cl. ................................. 350/636; 350/632; 248/483; 248/485
[58] Field of Search ............... 350/632, 633, 634, 636; 248/481, 483, 485, 487

[56] References Cited

U.S. PATENT DOCUMENTS 4,167,306  9/1979  Longland ............................ 350/636
4,573,794  3/1986  Covey et al. ....................... 248/487

FOREIGN PATENT DOCUMENTS 57-161810  5/1982  Japan ................................... 350/634

Primary Examiner—Bruce Y. Arnold
Assistant Examiner—J. P. Ryan
Attorney, Agent, or Firm—Limbach, Limbach & Sutton

[57] ABSTRACT

A mechanism (10) for adjustably mounting a laser mirror includes fixed and movable plates (20, 22) with a pivot assembly mounted therebetween. The mirror (44) is mounted on the movable plate (22). A pair of wedge structures interface between the two plates at locations spaced from the pivot assembly and function to vary the angle between the plates about the pivot assembly. In the preferred embodiment, the wedge structure includes a threaded screw (54) for driving a sphere (58) against an inclined plane (50). The assembly allows adjustment of the mirror face (46) about all axes.

18 Claims, 2 Drawing Sheets

ADJUSTABLE MIRROR MOUNT

TECHNICAL FIELD

The subject invention relates to a mechanism for adjustably mounting a mirror. The mechanism is particularly suitable for mounting a mirror in a laser resonator.

BACKGROUND OF THE INVENTION

A number of mechanisms for mounting mirrors in laser resonators have been developed. Many of these mechanisms include a means for adjusting the position of the mirror with respect to the laser beam so that the alignment of the beam can be varied. Alignment of the beam is particularly important for adjusting the output parameters of the laser. In addition, an adjustable mirror mount can be used to fine tune the angle of the output beam so that it can be properly directed.

One example of an adjustable mirror mount can be found in U.S. Pat. No. 4,818,089 issued Apr. 4, 1989 to Mefferd, assigned to the same assignee as the subject invention. The mirror mount described therein includes a one piece cylindrical gimbal ring having four flexure areas spaced 90° apart around the circumference thereof. These four flexure areas define two pivot axes which intersect at the center of the ring. By translating adjustment screws along an axis perpendicular to the mirror face, the angle of the mirror face can be varied.

The gimbal ring mirror mount described in the latter application is highly accurate and can be arranged such that the position of the center point of the mirror face does not vary substantially as the angle of the mirror is changed. The latter feature allows the alignment of the beam to be varied without significantly changing the length of the resonant cavity.

While the latter mirror mount is highly accurate and sophisticated, it is relatively costly to manufacture. As can be appreciated, a number of fabrication steps are required in order to machine the gimbal ring. Therefore, it would be desireable to provide a mirror mount which provides the advantages of a gimbal ring type of device but at lower cost.

Accordingly, it is an object of the subject invention to provide a new and improved mirror mount which is easy to fabricate.

It is another object of the subject invention to provide an improved adjustable mirror mount having high sensitivity.

It is still a further object of the subject invention to provide a new and improved mirror mount capable of dual axis adjustment.

It is still another object of the subject invention to provide a new and improved mirror mount which can be fabricated using standard parts for the motion drive components.

It is still a further object of the subject invention to provide a new and improved mirror mount which permits the adjustment screws to be mounted coplanar with the fixed plate and at the outer side edges thereof.

It is still another object of the subject invention to provide a mirror mount where the spring can be mounted at the centroid of a moveable plate.

SUMMARY OF THE INVENTION

In accordance with these and many others objects, the subject invention provides for an adjustable mirror mount for a laser mirror. The mirror mount includes both a fixed plate and a moveable plate. The mirror is mounted to the moveable plate. A pivot means, preferably defined by a ball joint, is provided to allow pivoting motion of the moveable plate with respect to the fixed plate. Adjustability is provided via a wedge means interfacing between the two plates and located a distance away from the ball joint. By adjusting the wedge means, the angle of the moveable plate can be varied which in turn varies the angle of the mirror face.

In the preferred embodiment, the wedge means is defined by an inclined plane formed on the moveable plate. A drive means is provided which includes a reciprocating rod for driving a ball against the incline plane. The rod is defined by a threaded screw mounted to the fixed plate in a manner to travel along an axis coplanar with the fixed plate. Tracks can be provided for guiding the balls.

In the preferred embodiment, a pair of wedge means are provided oriented at 90° from each other. In this manner complete adjustment of the mirror face through all angles can be achieved.

By using a threaded screw with a fine pitch to drive against an inclined plane, relatively small angular adjustments in the mirror face can be obtained. In addition, because the screws are mounted coplanar and at the outer edges of the fixed plate, accessability is improved. The configuration of the subject invention also allows the biasing force to be provided by a single spring, located at the centroid of the movable plate. By this arrangement, the moments are balanced and the number of springs required is minimized.

Further objects and advantages of the subject invention will become apparent from the following detailed description taken in conjunction with the drawings in which:

DETAILED DESCRIPTION OF THE PREFERRED EMBODIMENTS

Figure 1:
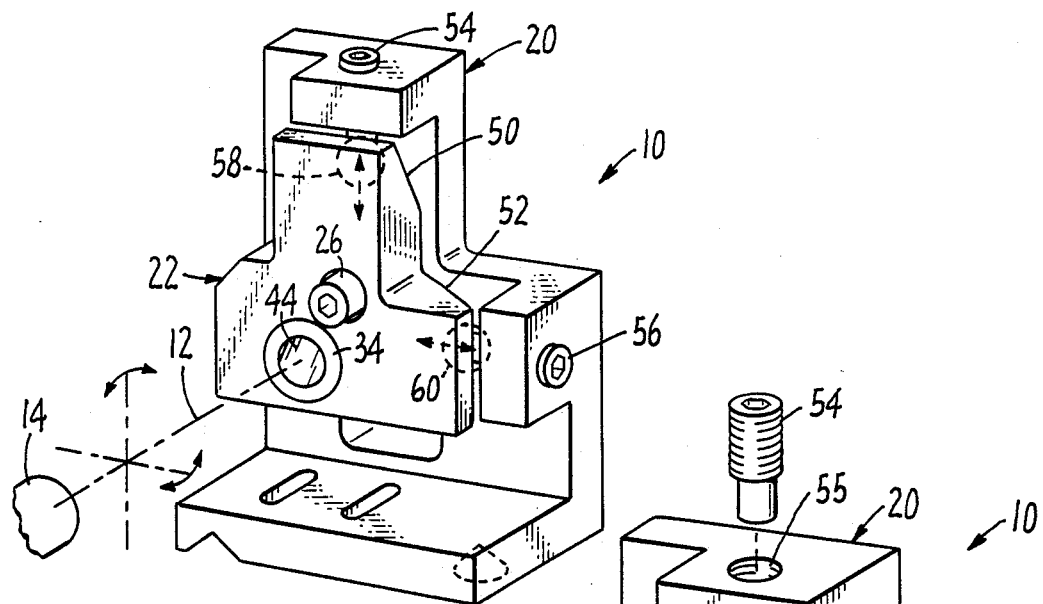
FIG. 1 is a perspective view of the adjustable mirror mount of the subject invention.

Referring to FIGS. 1-7, the adjustable mirror mount 10 of the subject invention is illustrated. The subject mechanism is intended to support a mirror for reflecting the beam 12 from a laser 14 as shown in FIG. 1.

The mirror mount 10 includes a fixed plate 20 and a movable plate 22. The plates are held together against the force of a biasing spring 24 which is mounted by a screw 26 threaded through aperture 28. Spring 24 is mounted at the centroid of the movable plate such that the moments are balanced about the spring thereby balancing the forces without any over turning moments.

Figure 5:
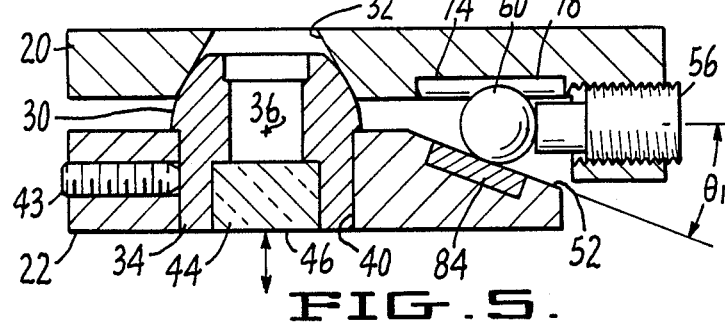
FIG. 5 is a cross-sectional view taken along the line 5—5 of FIG. 4.
Figure 7:
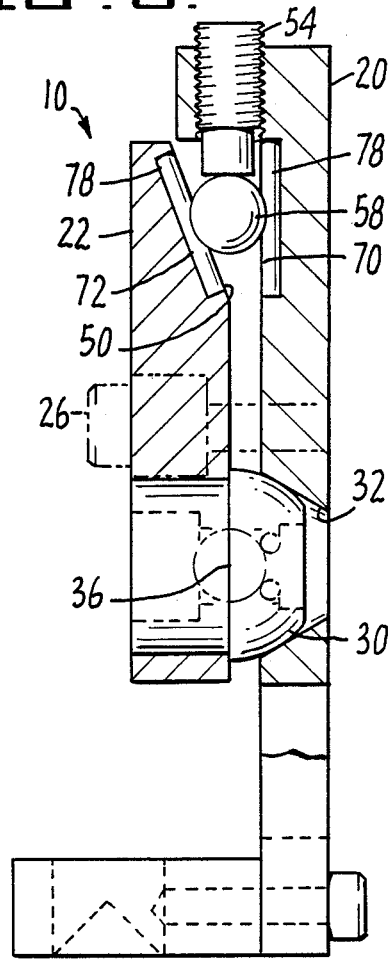
FIG. 7 is an end view of the adjustable mirror mount of the subject invention.

The movable plate is mounted for pivotal motion about a ball joint defined by spherical member 30 which is received in a conical recess 32. The ball joint allows the movable plate to pivot with respect to the fixed plate about the center 36 of spherical member 30 as shown in FIG. 7. Spherical member 30 is formed on the end of a hollow sleeve 34 which is mounted within aperture 40 of movable plate 22. Sleeve 34 is held in place by a pair of set screws 42 and 43 shown in FIG. 4. As best seen in FIG. 5, the inner portion of sleeve 34 is machined to receive a mirror 44. As can be appreciated, when movable plate is pivoted with respect to the fixed plate, the angle of the face 46 of the mirror 44 will be varied.

In accordance with the subject invention, an improved means is provided for changing the angle of the movable plate with respect to the fixed plate. This means is defined by a pair of wedge means consisting of an inclined plane and a drive mechanism. As seen best in FIG. 3, a pair of inclined planes 50 and 52 are provided on the movable plate 22. Each of these inclined planes is spaced from the ball joint.

The means for driving against the inclined planes includes a pair of threaded, fine pitch screws 54 and 56 received in apertures 55 and 57. Screws 54 and 56 co-act against a pair of hardened spherical balls 58 and 60.

As the screws are rotated and driven towards the ball joint, balls 58 and 60 will be translated against the inclined planes causing an angular change in the movable plate with respect to the fixed plate. If the rotation of the screws is reversed such that they are backed out of the apertures 55 and 57, the force of the spring 24 will cause the balls 58 and 60 to move back outwardly returning the pivot plate to its original position.

The direction of travel of screw 54 is perpendicular to the direction of travel of screw 56. Accordingly, the angular variation created by the adjustment of screw 54 will lie in a plane perpendicular to the plane of the angular variation caused by the adjustment of screw 56. By this arrangement, both screws can be used in combination to fully adjust the angle of face 46 of mirror 44 about all axes.

Figure 2:
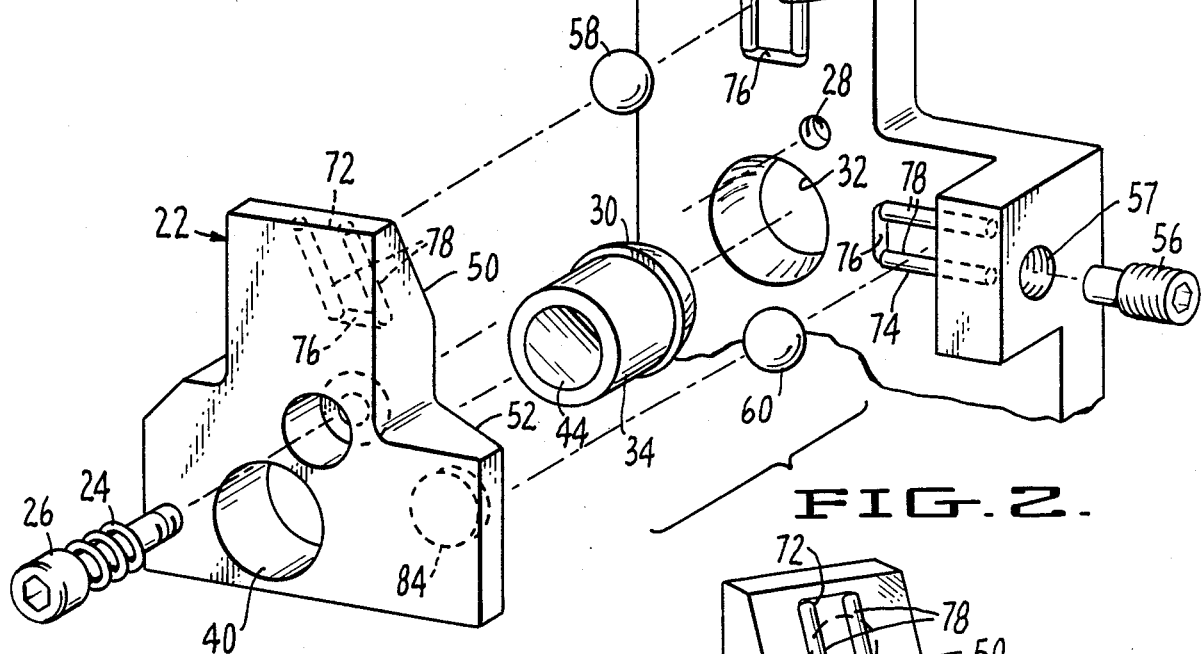
FIG. 2 is an exploded perspective view of the adjustable mirror mount of the subject invention.
Figure 3:
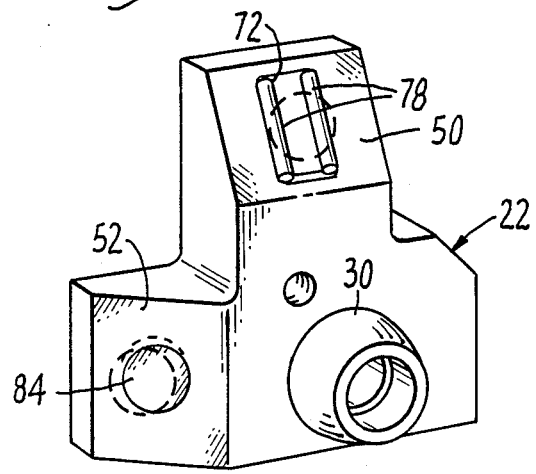
FIG. 3 is a perspective view of the moveable plate of the adjustable mirror mount of the subject invention.
Figure 6:
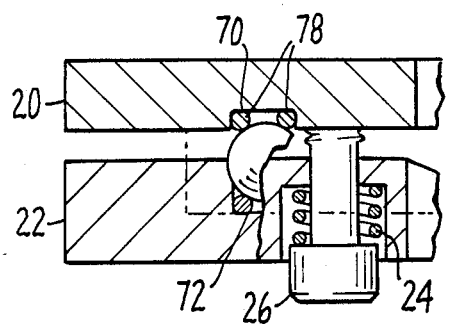
FIG. 6 is a partial, cross-sectional view taken along the line 6—6 of FIG. 4.

In the preferred embodiment, the movement of the balls 58 and 60 are guided by a set of tracks 70, 72 and 74. Each track is defined by a recess 76 within which are mounted a pair of spaced-apart hardened pins 78. Ball 58 is guided by a pair of opposed tracks 70 and 72. In contrast, only a single track 74 is provided to guide ball 60. As seen in FIGS. 2 and 3, a hardened carbide pad 84 is located on the movable plate opposite track 74. By using a pad rather than an additional track, the constraints on the movement of the device are reduced so that a more kinematic mounting structure is defined thereby facilitating alignment and motion of the balls without undue binding.

The subject design provides a highly sensitive mechanism for creating small angular adjustments at the face 46 of mirror 44. The degree of sensitivity of the device is dependent on a number of factors. The first factor is the distance between the center 36 of the ball joint and the wedge mechanism. As this distance is increased, sensitivity is increased. As will be seen in the figures, in the commercial embodiment of the subject invention, each of the two wedges assemblies is spaced from the ball joint a different amount. This difference is only present due to the particular configuration of the laser with which the subject mirror mount is first being used.

The next factor affecting sensitivity is the pitch of the screws 54 and 56. In the preferred embodiment, an 80 pitch screw is utilized which is the highest pitch that is easily available at low cost. A single rotation of an 80 pitch screw will generate 0.0125 inches of movement along the axis of the screw.

The third feature which affects sensitivity is the slope or angle of the inclined planes 50 and 52. This slope is shown as angle $\theta_1$ in FIG. 5. If this angle is decreased, the amount of rotation of the screw needed to effect a given angular tilt of the mirror face will be increased such that the sensitivity is increased. The amount which angle $\theta_1$ can be decreased is limited by friction. More specifically, a critical angle exists below which the kinematic coefficient of friction will prevent balls 58 and 60 from returning to their original position as the screws are backed out of the apertures. If the angle of the inclined plane is set below the critical angle, additional return springs would be necessary.

In the present design it has been determined that this critical angle is approximately 13°. In the preferred embodiment, the slope angle $\theta_1$ chosen for the inclined planes is 20° to allow a 50% margin of error over the 13° critical angle.

Figure 9:
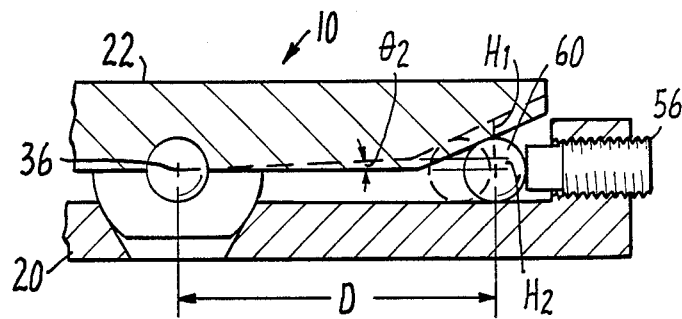
FIG. 9 is a partial, simplified cross-sectional view, similar to FIG. 7, illustrating the angular adjustment capability of the subject invention.

The change in the angle of the mirror face based on a given amount of lateral movement of ball 58 can best be understood with reference to FIG. 9 which illustrates the subject mirror mount in simplified form. FIG. 9 illustrates ball 58 in two positions. The right most position is shown in solid line while the left most position is shown in dotted line. When the ball is driven from the right to the left by screw 54 an amount X, the inclined plane 50 will be raised an amount $H_1$. This height is given by:

$$H_1 = (\text{Tan } \theta_1) X \qquad (1)$$

where $\theta_1$ is equal to the angle of the inclined plane. For simplicity, equations (1-3) assume that X is small such that the angle of the inclined plane with respect to the travel of the screw is a constant.

The amount the movable plate is raised by the movement of the ball is shown in FIG. 9 as $H_2$. This change in height will produce a change in the angle $\theta_2$ of the movable plate (and hence the mirror face) by an amount given by:

$$\text{Tan } \theta_2 = H_2/D \qquad (2)$$

where D is equal to the distance between the center of rotation 36 of the ball joint and the ball 58. Since $H_1 = H_2$, equations (1) and (2) can be combined as follows:

$$\text{Tan } \theta_2 = (\text{Tan } \theta_1) X/D \qquad (3)$$

In the commercial embodiment of the subject invention, the distance D between the center of rotation 36 of member 30 and the center throw of ball 58 is 1.75 inches. The angle $\theta_1$ of inclined plane 50 is 20°. A single rotation of an 80 pitch screw will produce a 0.0125 inch lateral movement of ball 58. Using equation (3), it will be seen that each rotation of screw 54 (near the center of its throw) will produce an angular change $\theta_2$ at the face of the mirror of 2.6 milliradians.

A mechanism designed in accordance with these parameters has produced repeatable adjustability and enough sensitivity to position a 52 micron waist diameter laser beam within another 52 micron waist diameter beam with relative ease. The latter adjustment is utilized where a pump laser beam is adjusted within the cavity of a die laser. Other suitable applications are possible with the subject device.

One of the additional desirable features of the subject design is the fact that the axis of translation of screws 54 and 58 is coplanar with fixed plate 20. In many prior art adjustable mirror mounts, adjustment screws are mounted on the movable plate perpendicular to the axis of the plate. Depending on the design of the laser, the accessibility to adjustment screws mounted in this fashion is limited. By placing the screws at the outer sides of the device and coplanar with the fixed plate, accessibility is enhanced and adjustment is facilitated.

Figure 8:
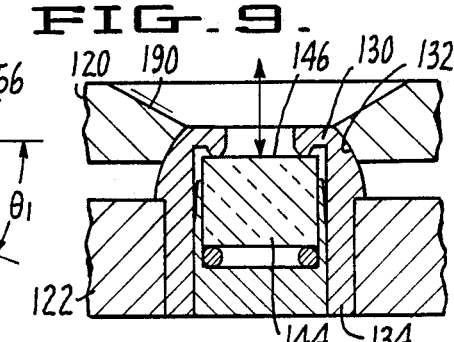
FIG. 8 is a cross-sectional view of the pivot means and mirror mounting of an alternate embodiment of the subject invention.
Figure 4:
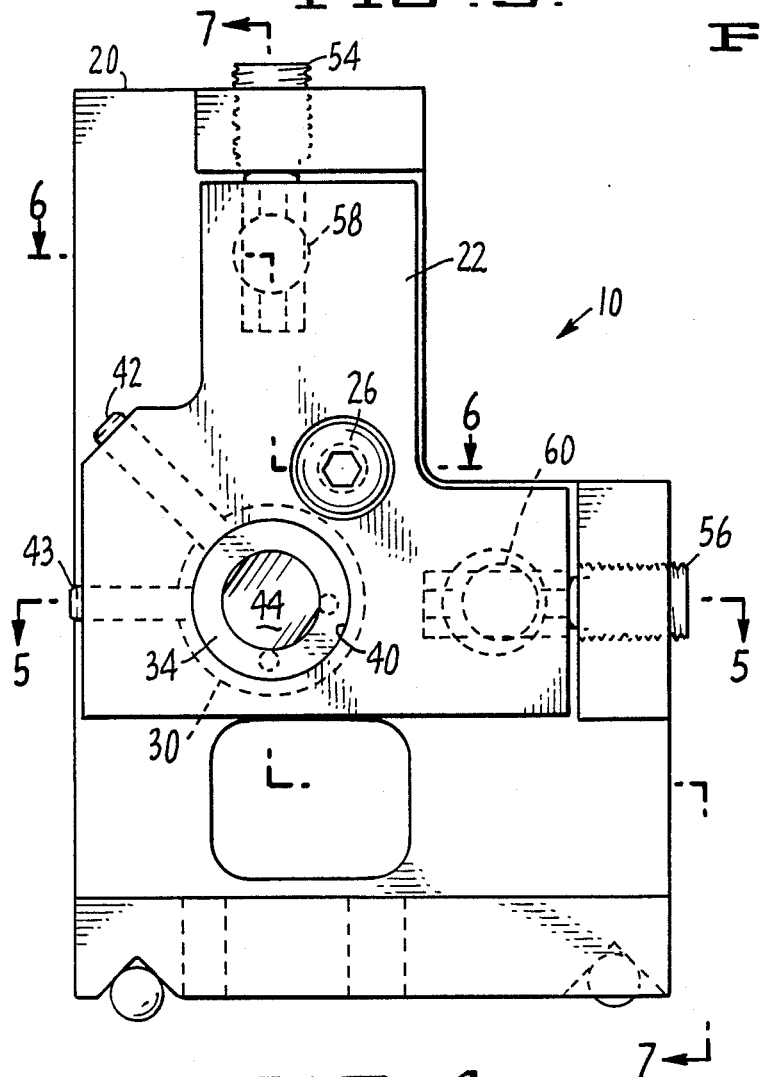
FIG. 4 is a side elevational view of the mirror mount of the subject invention.

FIG. 8 illustrates an alternate embodiment of the subject invention. Similar to the first embodiment of the subject invention, a sleeve 134 is mounted in a movable plate 122. Sleeve 134 carries a spherical member 130 which interfaces with a conical recess 132. The principal difference is that sleeve 134 is configured such that mirror 144 can be mounted with the reflecting face 146 facing towards the fixed plate 120. The fixed plate 120 includes a larger aperture 190 through which the light can be admitted. The alternate design can provide added flexibility in implementing the subject invention with particular laser configurations.

In either of the two above described embodiments, it is desirable to mount the mirror face as close as possible to the pivot point 36 to minimize changes in the position of the mirror as the angular adjustments are made. More specifically, the position of the mirror is typically fixed to define a specific resonant cavity length. It is desirable that even if any angular adjustments of the mirror are made, they will not change the length of the cavity. This requirement can be fulfilled if the mirror is mounted at the center of rotation of the pivot point.

In the illustrated embodiments, the mirror is mounted slightly off center for manufacturing convenience. This slight deviation will produce some small second order cavity length variations. These variations are relatively minor and can be tolerated.

In summary, there has been disclosed an improved mechanism for adjustably mounting a laser mirror. The mechanism includes fixed and movable plates with a pivot means mounted therebetween. The mirror is mounted on the movable plate. In accordance with the subject invention, a wedge means is provided interfacing between the two plates at a location spaced from the pivot means and functioning to vary the angle between the plates about the pivot means. In the preferred embodiment, the wedge means includes a threaded screw for driving a ball against an inclined plane. Preferably, a pair of wedge means are provided to allow full adjustability in all axes. The adjustable mirror mount is highly sensitive and can be produced at relatively low cost since the motion drive components do not have to be specially manufactured.

While the subject invention has been described with reference to preferred embodiments, various other changes and modifications could be made therein by one skilled in the art without varying from the scope and spirit of the subject invention as defined by the appended claims.

I claim:

1. An adjustable mirror mount comprising:
   a fixed plate;
   a movable plate;
   means for mounting a mirror to said movable plate;
   pivot means interfacing between said plates, said pivot means being defined by a ball joint having a hollow spherical member interacting with a conical surface and wherein said mirror mounting means is formed in said spherical member; and
   wedge means interfacing between said plates at a location spaced from said pivot means, said wedge means for varying the angle between said plates about said pivot means.

2. A mirror mount as recited in claim 1 wherein said wedge means comprises:
   an inclined plane; and
   drive means mounted for reciprocal movement and coacting against said inclined plane.

3. A mirror mount as recited in claim 2 wherein said drive means includes a reciprocating rod means and a ball driven by said rod means against said inclined plane.

4. A mirror mount as recited in claim 3 wherein said rod means is defined by a threaded screw.

5. A mirror mount as recited in claim 3 wherein said drive means includes a track for guiding said ball.

6. A mirror mount as recited in claim 2 wherein said inclined plane is carried by said movable plate and said drive means reciprocates on an axis coplanar with the fixed plate.

7. A mirror mount as recited in claim 2 including a second wedge means interfacing between said plates at a location spaced from said pivot means said second wedge means for varying the angle between said plates about said pivot means, with the plane in which said angular variation lies being perpendicular to the plane in which the angular variation induced by the first wedge means lies.

8. A mirror mount as recited in claim 2 further including biasing means for drawing said plates together and wherein said biasing means is located at the centroid of said movable plate.

9. An adjustable mirror mount comprising:
   a fixed plate;
   a movable plate;
   means for mounting a mirror to said movable plate;
   pivot means interfacing between said plates, said pivot means being defined by a ball joint having a hollow spherical member interacting with a conical surface and wherein said mirror mounting means is formed in said spherical member; and
   first and second wedge means interfacing between said plates at separate locations each spaced from said pivot means said wedge means for varying the angle between said plates about said pivot means, said first and second wedge means being oriented such that the planes in which said angular variations are respectively induced are perpendicular to each other and wherein each said wedge means includes an inclined plane and a drive means mounted for reciprocal movement and coacting against said inclined plane.

10. A mirror mount as recited in claim 9 wherein each said drive means includes a reciprocating rod means and a ball driven by said rod means against said inclined plane.

11. A mirror mount as recited in claim 10 wherein said rod means is defined by a threaded screw.

12. A mirror mount as recited in claim 10 wherein said drive means includes a track for guiding said ball.

13. A mirror mount as recited in claim 9 wherein each said inclined plane is carried by said movable plate and each said drive means reciprocates on an axis coplanar with the fixed plate.

14. A mirror mount as recited in claim 9 further including biasing means for drawing said plates together and wherein said biasing means is located at the centroid of said movable plate.

15. An adjustable mirror mount comprising:
a fixed plate;
a movable plate;
means for mounting a mirror to said movable plate;
pivot means interfacing between said plates;
biasing means for drawing the plates together; and
wedge means interfacing between said plates at a location spaced from said pivot means, said wedge means for varying the angle between said plates about said pivot means, said wedge means including:
an inclined plane;
a reciprocating threaded screw;
a ball, driven directly by said threaded screw against said inclined plane; and
a track for guiding said ball.

16. A mirror mount as recited in claim 15 further including a second wedge means interfacing between said plates at a location spaced from said pivot means, said second wedge means for varying the angle between said plates about said pivot means, with the plane in which said angular variation lies being perpendicular to the plane in which the angular variation induced by the first wedge means lies, said second wedge means including:
an inclined plane;
a reciprocating threaded screw;
a ball, driven directly by said threaded screw against said inclined plane; and
a track for guiding said ball.

17. A mirror mount as recited in claim 15 wherein said inclined plane is carried by said movable plate and said screw reciprocates on an axis coplanar with the fixed plate.

18. A mirror mount as recited in claim 15 wherein said biasing means is located at the centroid of said movable plate.

* * * * *